US012118280B1

(12) United States Patent
Lau et al.

(10) Patent No.: US 12,118,280 B1
(45) Date of Patent: Oct. 15, 2024

(54) ELECTRIC DRIVE UNIT SIMULATION

(71) Applicant: Monumo Limited, Saffron Walden (GB)

(72) Inventors: Chun-Ting Lau, Saffron Walden (GB); Daniel Bates, Saffron Walden (GB); Kevin Bersch, Saffron Walden (GB); William Gallafent, Saffron Walden (GB); Jaroslaw Pawel Rzepecki, Saffron Walden (GB); Alexey Kostin, Saffron Walden (GB); Jonathan Rayner, Saffron Walden (GB); Markus Kaiser, Saffron Walden (GB); Nicolas Durrande, Saffron Walden (GB); Rupert Tombs, Saffron Walden (GB); Ian Murphy, Saffron Walden (GB)

(73) Assignee: Monumo Limited, Essex (GB)

( * ) Notice: Subject to any disclaimer, the term of this patent is extended or adjusted under 35 U.S.C. 154(b) by 0 days.

(21) Appl. No.: 18/625,435

(22) Filed: Apr. 3, 2024

Related U.S. Application Data

(63) Continuation of application No. 18/447,791, filed on Aug. 10, 2023, now Pat. No. 11,977,826.

(51) Int. Cl.
  *G06F 30/27* (2020.01)
  *G06F 30/15* (2020.01)
  *G06F 119/18* (2020.01)

(52) U.S. Cl.
  CPC .............. *G06F 30/27* (2020.01); *G06F 30/15* (2020.01); *G06F 2119/18* (2020.01)

(58) Field of Classification Search
  CPC .......... G06F 30/00; G06F 30/27; G06F 30/15; G06F 2119/18; G06F 30/20
  USPC ...................................................... 703/8, 7, 6
  See application file for complete search history.

(56) References Cited

PUBLICATIONS

Gabdullin, Nikita et al., "Towards End-to-End Deep Learning Performance Analysis of Electric Motors", Feb. 3, 2021, Actuators, 10, 28. (Year: 2021).*
Murphey, Yi Lu et al., "Model-Based Fault Diagnosis in Electric Drives Using Machine Learning", Jun. 2006, IEEE/ASME Transactions on Mechatronics, vol. 11, No. 3, IEEE. (Year: 2006).*

* cited by examiner

*Primary Examiner* — Cedric Johnson
(74) *Attorney, Agent, or Firm* — Harness, Dickey & Pierce, P.L.O.

(57) ABSTRACT

A computer-implemented method of simulating operation of an electric drive unit to predict one or more performance parameters of the electric drive unit is provided. The electric drive unit comprises at least an electric motor. The method comprises obtaining parameters defining physical properties of the electric motor, obtaining parameters defining drive currents for driving the electric motor, processing the obtained parameters using a machine learning module trained a priori to predict a spatially varying electromagnetic and/or mechanical and/or thermal profile within the electric motor during operation, and providing as output a predicted profile for the electric motor, and using the predicted profile to compute the one or more performance parameters of the electric drive unit.

17 Claims, 6 Drawing Sheets

ELECTRIC DRIVE UNIT SIMULATION

CROSS-REFERENCE TO RELATED APPLICATION

This application is a continuation of U.S. application Ser. No. 18/447,791, filed on Aug. 10, 2023, the disclosure of which is hereby incorporated by reference in its entirety.

TECHNICAL FIELD

The present disclosure relates to electric drive units, and in particular to methods of simulating the operation of an electric drive unit and methods of optimising a design of an electric drive unit.

BACKGROUND

An electric drive unit of an electric vehicle comprises an electric motor and an inverter for providing drive currents to the motor. When designing an electric drive unit, computer-aided design (CAD) tools are often used to construct three-dimensional computer models. However, it can be computationally hard to accurately predict the performance of an electric drive unit from such a model since this usually requires multi-physics simulations, i.e. solving sets of coupled equations to predict, for example, the electrical, mechanical, and thermal behaviour of the electric drive unit during operation. Thus, in practice, simulating the operation of the entire electric drive unit is often not fast enough for efficient design optimisation.

To avoid these system-level simulations during design optimisation, "black box emulators" are commonly used instead, as illustrated in FIG. 1. Black box emulators are statistical models (e.g. neural networks) that are trained on a dataset generated by (computationally expensive) system-level simulations. The black box emulator of FIG. 1 receives parameters defining the electric motor and the currents provided by the inverter, and outputs predicted performance metrics, such as mean torque, torque ripple and inverter loss. While such black box emulators can be fast (i.e. computationally light) during inference, the prediction accuracy can be poor (in particular for input parameters which differ significantly from the training dataset). This is because the black box emulators attempt to capture the complex behaviour of the full system, and thus need to learn complicated interactions between dependent physical processes from a limited training dataset. Thus, there is a continued need to provide improved methods for efficient design optimisation of electric drive units.

SUMMARY

According to a first aspect there is provided a computer-implemented method of simulating operation of an electric drive unit to predict one or more performance parameters of the electric drive unit. The electric drive unit comprises at least an electric motor. The method comprises obtaining parameters defining physical properties of the electric motor, obtaining parameters defining drive currents for driving the electric motor, processing the obtained parameters using a machine learning module trained a priori to predict a spatially varying electromagnetic and/or mechanical and/or thermal profile within the electric motor during operation, and providing as output a predicted profile for the electric motor, and using the predicted profile to compute the one or more performance parameters of the electric drive unit.

The step of using the predicted profile to compute the one or more performance parameters of the electric drive unit may comprise one of a) solving a system of predefined equations for the predicted profile, and b) processing the predicted profile using a further machine learning module trained a priori to compute one or more performance parameters of an electric drive unit.

The further machine learning module may be trained using a training set comprising a plurality of training items. Each training item may comprise one or more performance parameters generated by solving the system of predefined equations for the respective training profile.

The spatially varying electromagnetic and/or mechanical and/or thermal profile within the electric motor during operation may specify, for each of a plurality of locations within the electric motor, a magnetic flux density, a magnetic field strength, a magnetic vector potential, a Maxwell stress tensor, a mechanical displacement/velocity/acceleration, an energy or power loss, or a temperature.

The machine learning module may be trained using a training set comprising a plurality of training items. Each training item may comprise a training electromagnetic and/or mechanical and/or thermal profile within the electric motor during operation generated by solving a further system of predefined equations for the parameters.

The machine learning module may provide as further output a parameter indicating an uncertainty associated with the predicted profile. The method may further comprise determining that the uncertainty associated with the predicted profile is greater than a threshold, generating, in response to determining that the uncertainty associated with the predicted profile is greater than the threshold, an additional training item corresponding to the predicted profile, and performing additional training of the machine learning module using the additional training item.

The one or more performance parameters being selected from a group may comprise one or more electromagnetic performance parameters, one or more mechanical performance parameters, one or more thermal performance parameters, and one or more energy performance parameters.

The one or more performance parameters may comprise a torque of the electric motor and an inverter loss.

The parameters defining physical properties of the electric motor may comprise parameters specifying a geometry of the electric motor. The electric motor may comprise a rotor and a stator, and the parameters specifying the geometry of the electric motor comprise parameters specifying a geometry of the rotor and/or the stator (e.g. a stator tooth geometry and/or a rotor tooth geometry).

The electric drive unit whose operation is to be simulated may comprise an inverter for providing said drive currents.

According to a second aspect there is provided a computer-implemented method of optimising a design of an electric drive unit with respect to one or more performance parameters. The electric drive unit comprises at least an electric motor. The design comprises parameters defining physical properties of the electric motor and parameters defining drive currents for driving the electric motor. The method comprises jointly optimising the parameters defining physical properties of the electric motor and the parameters defining the drive currents over a plurality of iterations, wherein each iteration comprises, performing the method according to the first aspect to predict the one or more performance parameters of the electric drive unit, and adjusting the parameters defining physical properties of the electric motor and the parameters defining the drive currents with an objective of improving the one or more performance parameters.

The parameters may be adjusted based on a genetic optimisation algorithm or a Bayesian optimisation algorithm.

The method may further comprise outputting the optimised design for manufacture of a corresponding the electric drive unit.

According to a third aspect there is provided method of manufacturing an electric drive unit comprising implementing the method according to the second aspect to obtain optimised parameters defining physical properties of the electric motor and the parameters defining the drive currents, and manufacturing the electric drive unit according to the obtained parameters. According to a fourth aspect there is provided computer readable medium comprising executable instructions that, when executed by a processor, cause the processor to implement the method according to first, second or third aspect.

DETAILED DESCRIPTION

When designing an electric drive unit, it is desirable to jointly optimise the electric motor and the inverter. This is because the performance of the motor (e.g. maximum torque and efficiency) depends on the specifics of the inverter (e.g. the waveform and amplitude of the drive currents provided by the inverter) and vice versa. The available design space (i.e. all possible combinations of motor and inverter designs) is, however, quite large. As a consequence, conventional methods that rely on system-level simulations are not suitable for joint motor-inverter optimisation because they are too slow to allow efficient exploration of the design space, and they do not support gradient-based optimisation (since multi-physics simulations are usually not differentiable). Similarly, black box emulators are also not suitable for joint motor-inverter optimisation because their prediction accuracy can be poor in portions of the design space which were not covered by the training data (in practice, it is not feasible to provide a training dataset large enough to cover the entire search space).

In overview, to solve the above problem and enable efficient joint motor-inverter optimisation, embodiments described herein propose partitioning a system-level simulation into a "data pipeline" of multiple smaller computation units connected in series (where each unit generates intermediate data that is processed by the next unit in the pipeline), and to use a small emulator model (i.e. a statistical model that is small compared to conventional black box emulators) in a portion of the pipeline that would otherwise be computationally expensive to simulate (e.g. the simulation of the electromagnetic fields within an electric motor). One or more further (small) emulator models may be used in respective one or more further portions of the pipeline instead of the respective simulator models. Using small models to replace specific simulation tasks means (i) that the underlying models can be selected and tailored based on the respective tasks, (ii) that less training data is required since the models are small and none of the models needs to capture full-system behaviour/dynamics, (iii) that the models can be trained and evaluated independently, and that (iv) active learning can be applied to any one of the models without having to run the computationally expensive system-level simulation (as described in detail below). As a consequence, multiple components of the system (such as the motor and the inverter) can be jointly optimised in an efficient manner, as described below with reference to FIGS. 2 and 3.

Figure 1:
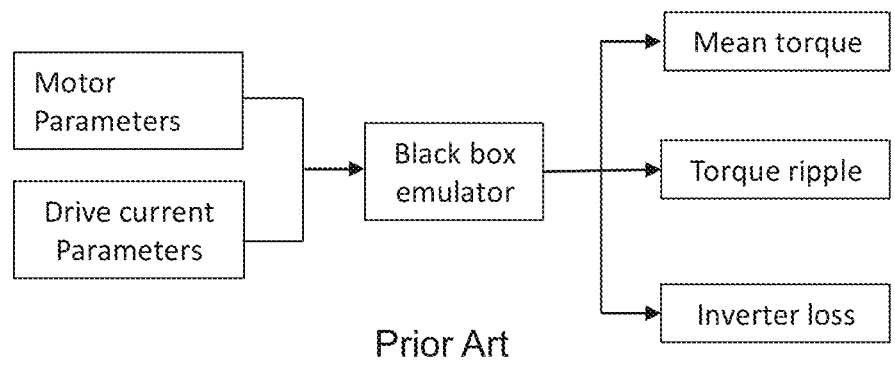
FIG. 1 is a block diagram of a known system for evaluating a parametrised design of an electric drive unit.
Figure 2:
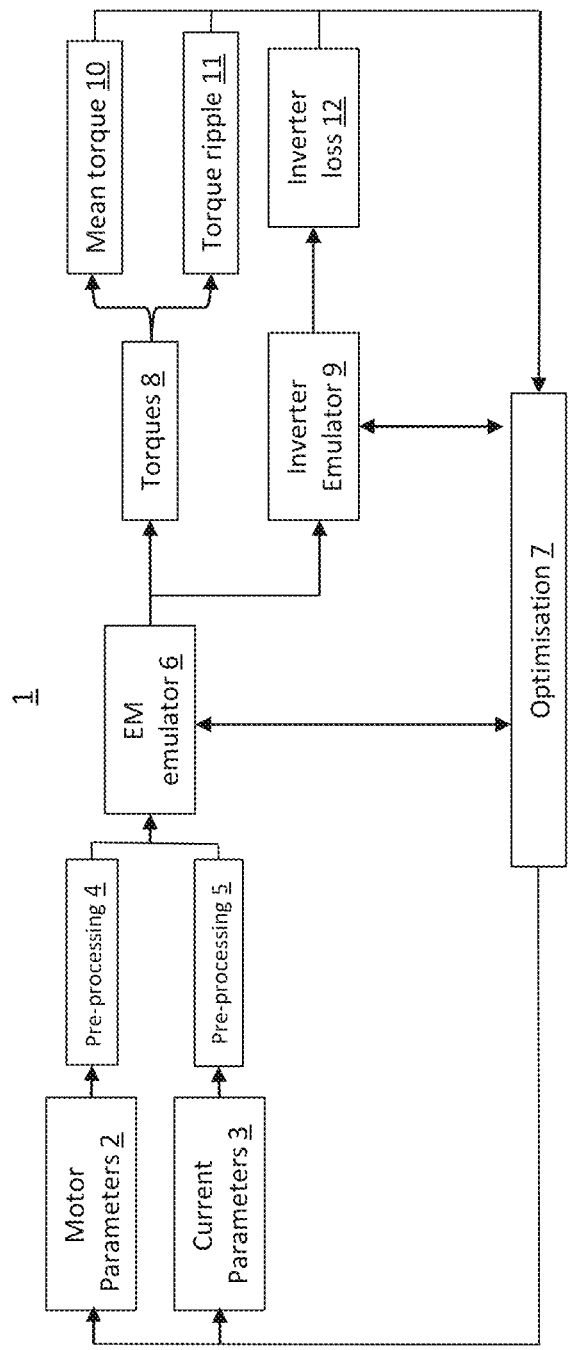
FIG. 2 is a block diagram of a system for optimising a parametrised design of an electric drive unit according to an embodiment.

FIG. 2 shows a block diagram of a data pipeline 1 for optimising a design of an electric drive unit. The electric drive unit comprises an electric motor and an inverter for providing drive currents to the motor. In general, the data pipeline 1 receives a parametrised design of the electric motor and the inverter, and computes one or more performance parameters of the electric drive unit. The parametrised design of the electric motor and the inverter can then be iteratively updated (i.e. adjusted) with an objective of improving the one or more performance parameters until a predefined criterion is satisfied, e.g. until the one or more performance parameters exceed predetermined thresholds or until each of one or more performance parameters converged. The data pipeline 1 can be implemented as a computer program on one or more computers in one or more locations.

The data pipeline 1 is now described in detail with reference to FIGS. 2 and 3. In an initial step S101, motor parameters 2 defining physical properties of the electric motor are obtained (e.g. from a user input). In particular, the motor parameters 2 may specify geometric properties of the motor and/or material properties of the motor. For example, the electric motor may comprise a rotor and a stator, and the geometric properties may include a tooth width and a tooth height of the rotor, and/or a tooth width and a tooth height of the stator. The material properties may include electrical properties, magnetic properties and/or thermal properties of various portions of the electric motor (e.g. as defined by the materials intended to be used in the manufacture of the motor). In general, the motor parameters may define a corresponding computer model of the electric motor (for example, the motor parameters may correspond to parameters of an electric motor design template).

Further in step S101, current parameters 3 are obtained (e.g. from a user input). The current parameters 3 define the electrical currents (or corresponding voltages) provided by the inverter during operation of the electric drive unit to drive the electric motor. The current parameters 3 may specify a waveform of the drive currents, i.e. the current parameters 3 may define amplitudes of the currents over time. For example, the electric motor may be a three-phase electric motor, and the current parameters 3 may define amplitudes of three corresponding currents for driving the electric motor. The current parameters 3 may specify the waveform of the drive currents using a (truncated) Fourier series representation (e.g. a sum of sine functions of different frequencies). Alternatively, the current parameters 3 may specify current values for each of a plurality time steps. As described in detail below, the obtained motor and current parameters 2, 3 may be initialized (e.g. predefined by a user) and over later iterations updated to find motor and current parameters that optimise the design of the electric drive unit with respect to one or more performance parameters. The motor and current parameters 2, 3 may be initialised based on "historical data", i.e. with values corresponding to a known design or with values obtained in a previously performed optimisation of a similar electric drive unit.

In step S102, the motor parameters 2 and the current parameters 3 are processed respectively by pre-processing modules 4 and 5 which provide their outputs to an electromagnetic emulator 6 (EM emulator 6 for short). In general, the pre-processing modules 4, 5 process the obtained parameters such that the generated output is suitable for being processed by the EM emulator 6. In general, the pre-processing modules 4, 5 may process the obtained parameters (which typically comprise a relatively small number of parameters) to generate a data object that associates each point of a (large) plurality of points with respective properties. In this case, the plurality of points may correspond to a plurality of points in space (for the motor parameters 2) or to a plurality of points in time (for the current parameters 3). For example, the module 4 may process the motor parameters 2 to generate a computer model (e.g. a CAD model or the like) of the electric motor according to the parameters 2. Similarly, the module 5 may process the current parameters 3 to generate current values for each of the drive currents for each of a plurality of time steps according to the current parameters 3. As one (simplified) example, the current parameters 3 may specify a period of 0.1 seconds and an amplitude of 100 A, and the module 5 may process the current parameters 3 to generate a waveform with a particular shape (e.g. sine wave) and possibly other default properties that the optimisation module 7 may not change. Thus, the EM emulator 6 can then query the waveform to get the current at any point in time. In some embodiments, the modules 4, 5 may further perform an input validation step, for example to ensure that the specified geometry is continuous, that the motor can rotate without different components colliding with each other, and the like. In other embodiments, the motor and current parameters 2, 3 may be directly input into the EM emulator 6.

In step S103, the EM emulator 6 processes the outputs of the pre-processing modules 4, 5 (i.e. the processed motor and current parameters 2, 3) to predict a spatially varying electromagnetic and/or mechanical and/or thermal profile within the electric motor during operation. This means that the EM emulator 6 predicts the electromagnetic and/or mechanical and/or thermal profile that would be generated within the electric motor (as specified by the motor parameters 2) through driving the motor with currents as specified by the current parameters 3. The EM emulator 6 may receive further inputs specifying operating conditions of the electric drive unit (e.g. an operating temperature, a load of the electric motor, and the like).

The output of the EM emulator 6 may comprise an array of numerical values where each element of the array specifies an electrical and/or magnetic property at a particular location within the motor. For example, the spatially varying electromagnetic and/or mechanical and/or thermal profile predicted by the EM emulator 6 may specify (for each element of the array) a magnetic flux density, a magnetic field strength, a magnetic vector potential, a Maxwell stress tensor, a mechanical displacement/velocity/acceleration, an energy loss, a power loss or a temperature. The EM emulator 6 may be further configured to provide, as an auxiliary output, parameters specifying an uncertainty associated with the predicted electromagnetic and/or mechanical and/or thermal profile. The parameters specifying the uncertainty of the predicted profile may be provided to an optimisation module 7, as described in detail below.

The EM emulator 6 may comprise a machine learning module trained, for example, by a supervised training method as described below with reference to FIG. 3A-B. Any known suitable architecture may be used to implement the machine learning module (e.g. neural networks). In particular, the machine learning module may be implemented using an "uncertainty aware" statistical model such as Gaussian process model or a Bayesian neural network. As described below with reference to step S104, the use of an uncertainty aware model allows active learning, i.e. "on-demand" training of the EM emulator 6 with training items specifically generated to reduce the prediction uncertainty for a particular set of motor and current parameters 2, 3. Further, the EM emulator 6 may be differentiable (this means that gradient optimisation can be used since gradients of the predicted profiles with respect to motor and current parameters 2, 3 can be computed).

In general, the electromagnetic and/or mechanical and/or thermal profile within the motor changes depending on the relative rotation of the rotor and the stator of the electric motor. To extract relevant performance parameters for a particular design, it is therefore desirable to predict the electromagnetic and/or mechanical and/or thermal profile for a plurality of rotational orientations. To this end, the EM emulator 6 may be further configured to predict (and output) the spatially varying electromagnetic and/or mechanical and/or thermal profile within the electric motor for each of a set of predefined rotational orientations of the electric motor. For example, a full (360°) rotation of the rotor relative to the stator may be divided up into incremental steps, and the electromagnetic and/or mechanical and/or thermal profile within the electric motor may be predicted for each step. Further, the EM emulator 6 may generate a corresponding electromagnetic and/or mechanical and/or thermal profile and associated uncertainty for each of a set of predefined rotational orientations of the electric motor.

Figure 4A:
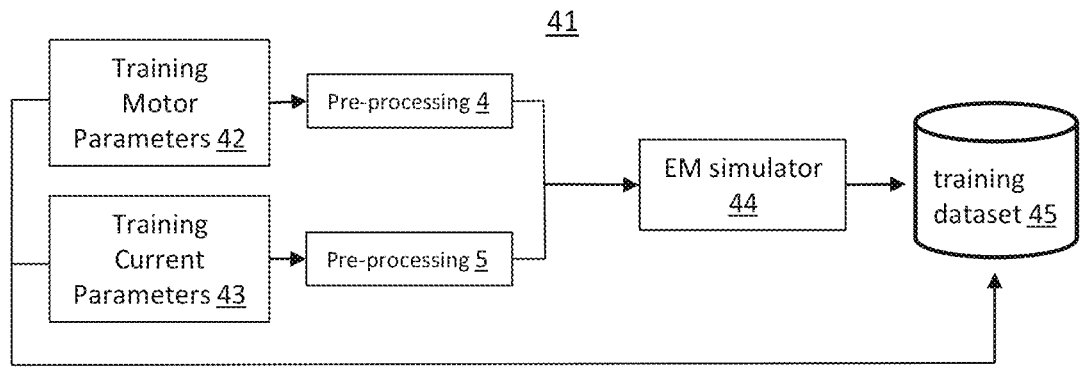
FIG. 4A is a block diagram of a system for generating training data for training an electromagnetic emulator according to an embodiment.
Figure 4B:
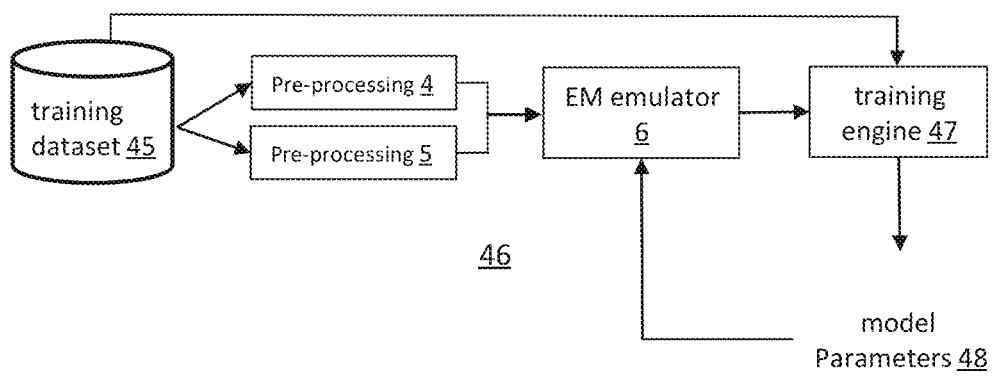
FIG. 4B is a block diagram of a training system for training the electromagnetic emulator according to an embodiment.

The training of the EM emulator 6 is described with reference to FIGS. 4A and 4B. FIG. 4A shows a system 41 for generating a training dataset 45 comprising a plurality of training items using a EM simulator 44. To generate a training item, training motor parameters 42 and training current parameters 43 are obtained (e.g. selected by an expert user). The training parameters 42, 43 may be processed using the pre-processing modules 4, 5 (as described with reference to FIG. 2) before being input into the EM simulator 44. The EM simulator 44 processes the received inputs to generate a corresponding electromagnetic and/or mechanical and/or thermal profile within the electric motor during operation by performing a computational simulation (i.e. by solving a system of predefined equations for the inputs). The computational simulation may comprise a finite element method. The training parameters 42, 43 and the simulated profile are added, as a training item, to the training dataset 45. It is understood that the training dataset 45 may comprise further training items, for example previously generated training items from other simulations and motors. FIG. 4B shows a system 46 for training the EM emulator 6 using the training dataset 45. For each training item of the training dataset 45, the training motor and current parameters are processed using the respective pre-processing modules 4, 5. The output of the modules 4, 5 is input into the EM emulator 6 to predict a corresponding electromagnetic and/or mechanical and/or thermal profile. The predicted profile and the corresponding simulated profile are provided to a training engine 47. The training engine 47 may use any known suitable method to update model parameters 48 of the EM emulator 6 such that the profiles predicted by the EM emulator 6 match the simulated profiles for the training dataset 45 (e.g. by minimising a cost function using back-propagation and gradient descent methods). For example, the training engine 47 may determine an error between the predicted profiles and the simulated profiles, and generate updated model parameters 48 of the EM emulator 6 such that the determined error is reduced.

Referring back to FIGS. 2 and 3, in step S104, the optimisation module 7 processes the parameters specifying the uncertainties of the predicted profiles to determine whether to further train the EM emulator 6 using active learning. The optimisation module 7 may use a Bayesian optimisation method (or any other known suitable algorithm) to determine whether to further train the EM emulator 6 using active learning. For example, the optimisation module 7 may determine to further train EM emulator 6 using active learning if a prediction uncertainty of one of the predicted profiles (corresponding to a particular rotational orientation of the electric motor) exceeds a predefined threshold. In this case, the method proceeds with step S105, i.e. with performing a simulation (e.g. using the EM simulator 44 of FIG. 4A) based on the motor and current parameters 2, 3 and the respective rotational orientation of the electric motor to generate a simulated electromagnetic and/or mechanical and/or thermal profile within the electric motor during operation. The simulated profile can then be used to replace the previously predicted profile when proceeding with step S106. Further, the simulated profile can be used to form a new training item for the EM emulator 6, and the EM emulator 6 may be further trained using the newly generated training item.

Thus, "active learning" enables an efficient use of computational resources, since the simulation of the electromagnetic and/or mechanical and/or thermal profile is (only) performed when the simulation result is particularly useful (i.e. when the prediction by the EM emulator 6 is unreliable). This does not only prevent the use of inaccurate profiles downstream, i.e. for the computation of the performance parameters but also enables targeted (i.e. data-efficient) improvements of the EM emulator 6. This is because these simulated profiles are particularly useful for further training the EM emulator since they typically correspond to input data that the EM emulator 6 has not been exposed to during training but which are highly relevant for finding an improved design. Consequently, once trained with the newly generated training items, the prediction uncertainty of the EM emulator 6 will be lower in subsequent iterations for similar motor/current parameters and a similar relative motor orientation.

In step S109, the predicted profiles are used to compute one or more performance parameters of the electric drive unit. To this end, the data pipeline 1 may comprise one or more modules for computing performance parameters of the electric drive unit from the output of the EM emulator 6, i.e. from the predicted electromagnetic and/or mechanical and/or thermal profiles. These modules may comprise differentiable models. In general, statistical models and/or deterministic models can be used to compute the performance parameters (such deterministic models are models based on systems of predefined equations for the predicted profile which can be solved to determine one or more performance parameters of the electric drive unit). In general, the one or more performance parameters (are selected to) depend on both the motor and the current parameters 2, 3 (to allow joint motor-inverter optimisation). In the specific embodiment of FIG. 2, the data pipeline 1 further comprises a torques module 8 and an inverter emulator 9 to compute performance parameters of the electric drive unit.

The torques module 8 processes the electromagnetic and/or mechanical and/or thermal profiles predicted by the EM emulator 6 to predict a corresponding torque provided by the electric motor. In particular, the torques module 8 may process the profiles predicted for each of the set of predefined rotational orientations to predict a corresponding torque and compute, as performance parameters of the electric drive unit, a mean torque 10 (i.e. the torque when averaged over a full rotation of the rotator) and torque ripples 11. The torque ripples 11 may indicate a variation of the provided torque over a full rotation of the rotator (e.g. the torque ripples 11 may indicate a standard deviation of the predicted torque values, peak-to-peak torque values, or the like). In the embodiment of FIG. 2, the torques module 8 is implemented as a deterministic module. In other embodiments, the torques module 8 may be implemented as a (trained) statistical module. In any case, the torques module 8 may be differentiable (to enable gradient-based optimisation as described below). The torques module 13 may be further configured to compute a corresponding uncertainty of the computed mean torque 10 and the torque ripples 11 based on the uncertainty of the predicted profile generated by the EM emulator 6.

The inverter emulator 9 processes the electromagnetic and/or mechanical and/or thermal profiles predicted by the EM emulator 6 to predict an inverter loss 12 (e.g. a power loss, i.e. a difference between the electrical power provided by the inverter and the mechanical power provided by the motor during operation). In an embodiment, the inverter emulator 9 may receive as further input the current parameters 3 (or the output of the module 5). In this case, the inverter emulator 9 may process the predicted electromagnetic and/or mechanical and/or thermal profiles corresponding to the set of predefined rotational orientations of the electric motor to take into account any additional current generated by the spinning motor. In the embodiment of FIG. 2, the inverter emulator 15 comprises a machine learning module trained, for example, by a supervised training method as described below with reference to FIG. 5A-B. Any known suitable architecture may be used to implement the inverter emulator 9 (e.g. neural networks). In particular, the inverter emulator 9 may be implemented as an uncertainty aware model, and may be further configured to compute an uncertainty of the predicted inverter loss 12. In any case, the inverter emulator 9 may be differentiable (to enable gradient-based optimisation as described below).

Figure 5A:
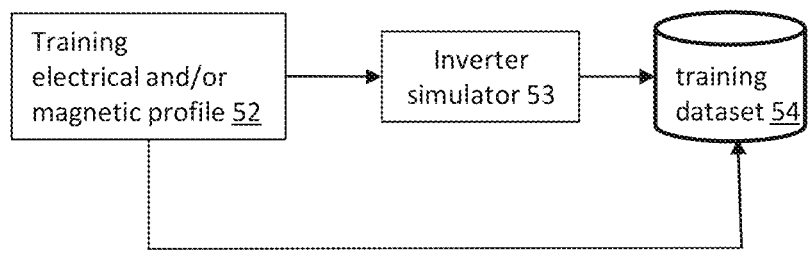
FIG. 5A is a block diagram of a system for generating training data for training an inverter emulator according to an embodiment.

The inverter emulator 9 can be trained in a similar manner as the EM emulator 6. FIG. 5A shows a system 51 for generating a training dataset 54 comprising a plurality of training items using an inverter simulator 53. To generate a training item, a training electromagnetic and/or mechanical and/or thermal profile 52 is obtained (e.g. from a user input of an expert user) and input into the inverter simulator 53.

Figure 5B:
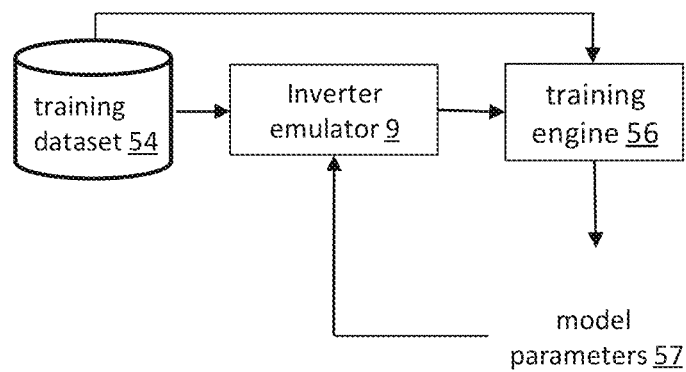
FIG. 5B is a block diagram of a training system for training the inverter emulator according to an embodiment.

The inverter simulator 53 processes the received profile to generate a corresponding inverter loss by performing a computational simulation (i.e. by solving a further system of predefined equations for the input profile). The training profile 52 and corresponding simulated inverter loss are added, as a training item, to the training dataset 54. FIG. 5B shows a system 55 for training the inverter emulator 9 using the training dataset 54. For each training item of the training dataset 54, the training profile is processed using the inverter emulator 9 to predict a corresponding inverter loss. The predicted inverter loss and the corresponding simulated inverter loss are provided to a training engine 56. The training engine 56 may use any known suitable method to update model parameters 57 of the inverter emulator 9 such that the inverter loss predicted by the inverter emulator 9 matches the simulated inverter loss for the training dataset 54 (e.g. the same or similar methods as described above for training the EM emulator 6).

Referring back to FIGS. 2 and 3, in step S107, the optimisation module 7 processes the parameters specifying the uncertainties of the computed inverter loss 12 to determine whether to further train the inverter emulator 9 using active learning (as described above for the EM emulator 9). For example, in step S107, the optimisation module 7 may determine that active learning is required when the prediction uncertainty associated with the inverter loss 12 computed by the inverter emulator 9 exceeds a predefined threshold. If so, a corresponding simulation may be performed (S108) to replace the computed inverter loss 12 with the simulated inverter loss, and to further train the inverter emulator 9 based on the simulated inverter loss.

In step S109, the optimisation module 7 processes the computed performance parameters (i.e. the mean torque 10, the torque ripple 11, and the inverter loss 12) to determine whether another iteration (i.e. steps S101-S108) is to be performed (with adjusted motor and current parameters). The optimisation module 7 may determine that a further iteration is required based any suitable criterion. For example, the optimisation module 7 may determine that a further iteration is required based on the determination that at least one of the performance parameters has not converged yet (e.g. that at least one of the performance parameters has significantly improved over the last iteration). As another example, the optimisation module 7 may determine that a further iteration is required based on the determination that not each of the performance parameters exceeds a predefined threshold. More generally, the optimisation module 7 may use any known suitable optimisation method to determine whether a further iteration is required and, if so, how to adjust the motor and current parameters with an objective to find the optimal motor and current parameters with respect to the performance parameters (for example genetic algorithms, particle-swarm-optimisation, or design-of-experiment based approaches). In other words, the optimisation module 7 may select motor and current parameters for the next iteration in an intelligent and guided manner based on the performance parameters computed in previous iterations.

The optimisation module 7 may also process the uncertainties of the computed performance parameters to determine that a further iteration is required and to determine the adjusted motor and current parameters for the next iteration. Further, the optimisation module 7 may further implement a Bayesian optimisation method by selectively training the EM emulator 6 and/or inverter emulator 9 using active learning. In this way an exploration-exploitation trade-off policy can be implemented which, for example, tries to jointly optimise the motor and current parameters while keeping the number of performed simulations low. For example, in order to "explore", the optimisation module 7 may select specific motor and current parameters for which the predicted profile and/or the computed inverter loss are expected (based on the previously computed performance parameters and associated uncertainties) to be large, generate training data by performing corresponding simulations and perform further training of the EM emulator 6 and/or inverter emulator 9 based on this training data (i.e. perform active learning as described above with reference to steps S105 and S108). This means that the prediction uncertainty for a selected, relevant part of the search space can be reduced in a targeted (i.e. data-effective) manner.

Referring back to FIGS. 2 and 3, if the optimisation module 7 determines in step S109 that no further iterations are to be performed, the method proceeds with step S110, where the optimised motor and current parameters are output. A digital design of the electric drive unit for manufacture based on the optimised motor and current parameters may be generated and output. In step S112, the electric drive unit may be manufactured according to the design data, i.e. so that the manufactured electric drive unit comprises an electric motor as defined by the optimised motor parameters and an inverter that is configured to provide, during operation, drive currents as defined by the optimised current parameters. Thus, the digital design may comprise physical parameters (that can be used by a manufacturing apparatus for manufacturing the electric motor) and control parameters (e.g. the waveforms of the currents provided by inverter as defined by the optimal current values). The control parameters may be stored in a controller of the inverter to control the drive currents during operation. It is understood that the design data can be used in a number of ways to facilitate the manufacturing of the electric drive unit. For example, the digital design data may be used to design and manufacture moulds for casting individual parts of the electric motor. The moulds can then be used for (large scale) manufacturing of the individual parts of the electric motor which in turn can be assembled into a complete electric motor.

Figure 3:
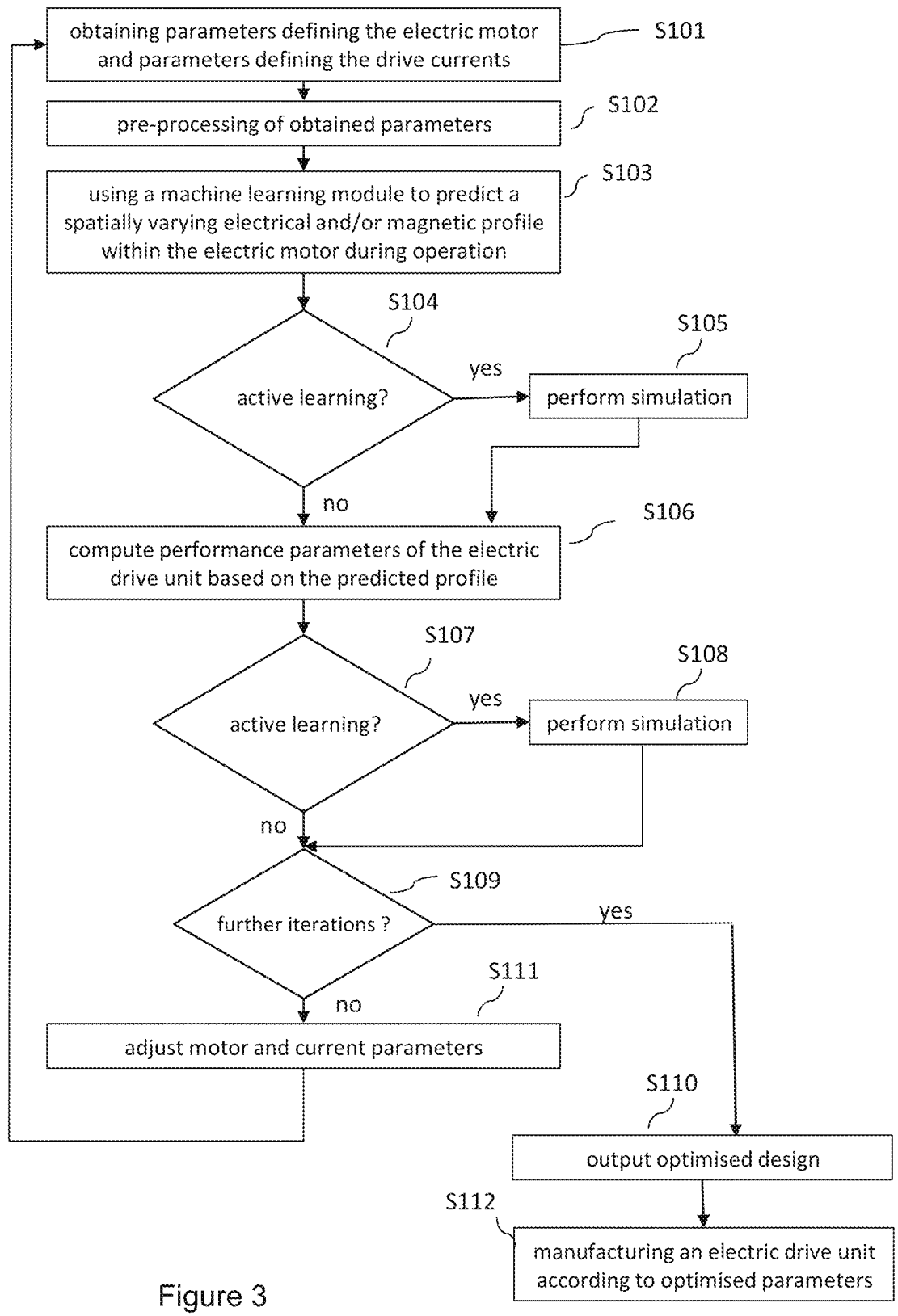
FIG. 3 is a flow diagram of an example process according to an embodiment.
Figure 6:
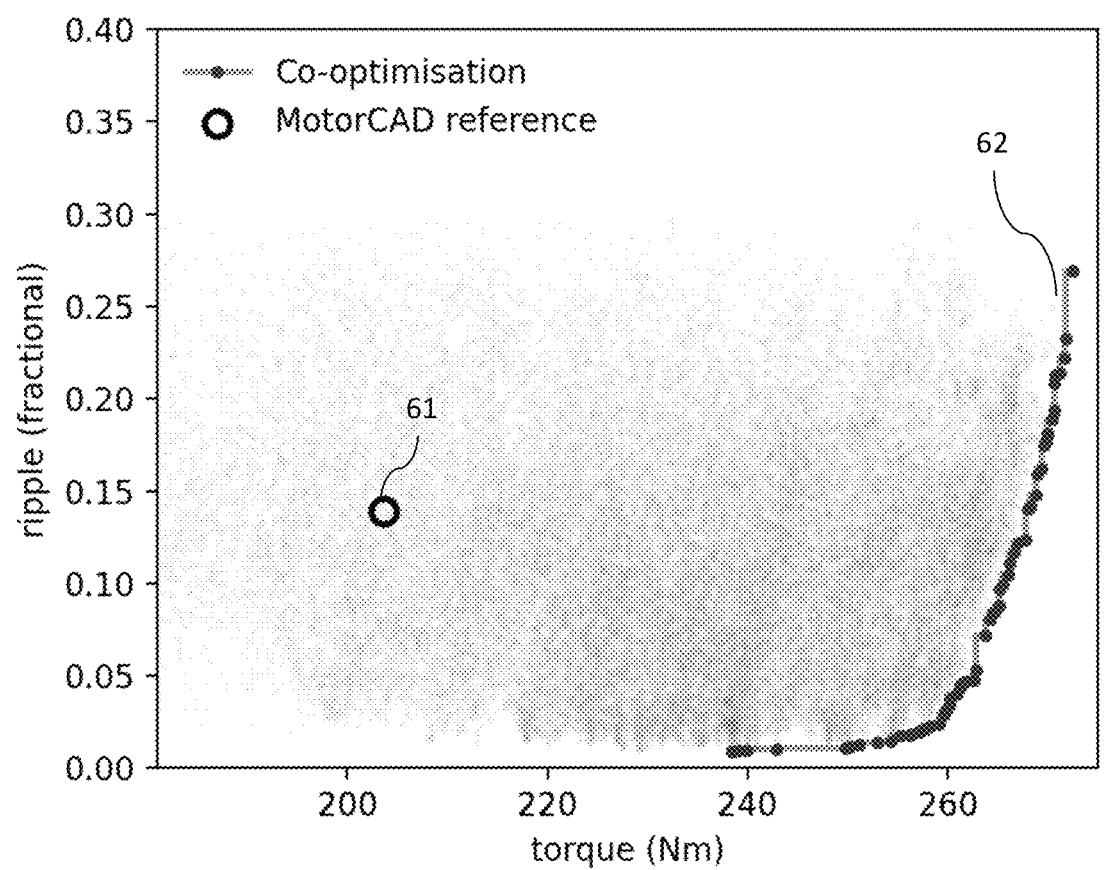
FIG. 6 is a graph of performance parameters computed during an iterative optimisation of an electric drive unit using the system of FIG. 2.

FIG. 6 illustrates data (and insights) of a type obtainable by performing the method of FIG. 3. In this example, the illustrated performance parameters comprise torque ripple and mean torque. Each point in the graph represents a set of motor and current parameters that may be computed during a joint optimisation of the motor and current parameters (i.e. during an iterative process that selects motor and current parameters in an intelligent and guided manner based on previously computed performance parameters, as described above). NB. The massive number of simulations performed and illustrated means that the data points in the Figure are not necessarily individually identified and the data set is shown more as shading where darker areas indicate a greater density of data points and lighter areas indicate a lower density of data points.

The circle 61 in FIG. 6 indicates a starting point of the optimisation (e.g. an initial design). The connected points 62 form the "Pareto front" of the joint motor-current optimisation, i.e. the points 62 represent the sets of motor and current parameters for which one performance parameter cannot be further improved without decreasing the other performance parameter. The points in the graph of FIG. 6 are clustered more tightly around the (optimal) points 62 because the optimisation module 7 learns that those are interesting regions to explore. In this example, the Pareto front of the jointly-optimised design includes designs with a predicted torque of about 240 Nm and very low torque ripple. The Figure shows that joint optimisation, as enabled by the above described embodiments, results in improved designs of electric drive units.

Various modifications will be apparent to those skilled in the art. For example, whilst the embodiment of FIG. 2 includes the torques module 8 and the inverter emulator 9 for determining performance parameters of the electric drive unit from the output of the EM emulator 6, other embodiments may include (in addition or as alternative) modules for determining different performance parameters, for example modules configured to process the output of the EM emulator 6 to predict copper losses or core losses of the electric motor.

In an embodiment, each of the EM emulator 6, the torques module 8, and the inverter emulator 9 may be differentiable, and the optimisation module 7 may use (in addition or as an alternative to the iterative optimisation described above) a gradient-based optimisation method to determine optimal motor and current parameters with respect to the performance parameters.

Whilst the data pipeline 1 of FIG. 2 has been described in the context of design optimisation, it is understood that the data pipeline 1 is also suitable for other design related tasks. For example, the data pipeline 1 may be used for simulating operation of an electric drive unit to predict one or more performance parameters of the electric drive unit (i.e. without performing the optimisation of steps S109 and S111 of FIG. 3). This is useful when testing a new concept design or determining the effect of a particular change to a previous design.

It will be appreciated by the person of skill in the art that various modifications may be made to the above described embodiments without departing from the scope of the present invention.

The invention claimed is:

1. A computer-implemented method of simulating operation of an electric drive unit to predict one or more performance parameters of the electric drive unit, the electric drive unit comprising at least an electric motor, the method comprising:
    obtaining parameters defining physical properties of the electric motor;
    obtaining parameters defining drive currents for driving the electric motor;
    processing the obtained parameters using a machine learning module trained a priori to predict a spatially varying electromagnetic and/or mechanical and/or thermal profile within the electric motor during operation, and providing as output a predicted profile for the electric motor and a parameter indicating an uncertainty associated with the predicted profile,
    determining that the uncertainty associated with the predicted profile is greater than a threshold;
    generating, in response to determining that the uncertainty associated with the predicted profile is greater than the threshold, a new predicted profile comprising a training electromagnetic and/or mechanical and/or thermal profile within the electric motor during operation generated by solving a system of predefined equations for the obtained parameters;
    performing additional training of the machine learning module using the new predicted profile and the obtained parameters; and
    using the new predicted profile to compute the one or more performance parameters of the electric drive unit.

2. The method according to claim 1, wherein the using the new predicted profile to compute the one or more performance parameters of the electric drive unit comprises one of:
    a) solving a further system of predefined equations for the new predicted profile; and
    b) processing the new predicted profile using a further machine learning module trained a priori to compute one or more performance parameters of an electric drive unit.

3. The method according to claim 2, wherein the further machine learning module is trained using a training set comprising a plurality of training items, each training item comprises one or more performance parameters generated by solving the further system of predefined equations for the respective training profile.

4. The method according to claim 1, wherein said spatially varying electromagnetic and/or mechanical and/or thermal profile within the electric motor during operation specifies, for each of a plurality of locations within the electric motor, one of:
    a magnetic flux density;
    a magnetic field strength;
    a magnetic vector potential;
    a Maxwell stress tensor;
    a mechanical displacement/velocity/acceleration;
    an energy or power loss; and
    a temperature.

5. The method according to claim 1, wherein the machine learning module is trained using a training set comprising a plurality of training items, each training item comprises a training electromagnetic and/or mechanical and/or thermal profile within the electric motor during operation generated by solving the system of predefined equations for the parameters.

6. The method according to claim 1 wherein the one or more performance parameters being selected from a group comprising:
    one or more electromagnetic performance parameters;
    one or more mechanical performance parameters;
    one or more thermal performance parameters; and
    one or more energy performance parameters.

7. The method according to claim 1, wherein the one or more performance parameters comprise one or more of a torque of the electric motor, a torque ripple, and an inverter loss.

8. The method according to claim 1, wherein the parameters defining physical properties of the electric motor comprise parameters specifying a geometry of the electric motor.

9. The method according to claim 8, wherein the electric motor comprises a rotor and a stator, and the parameters specifying the geometry of the electric motor comprise parameters specifying a geometry of the rotor and/or the stator.

10. The method according to claim 9, wherein the parameters specifying a geometry of the electric motor specify a stator tooth geometry and/or a rotor tooth geometry.

11. The method according to claim 1, wherein the electric drive unit whose operation is to be simulated comprises an inverter for providing said drive currents.

12. A computer-implemented method of optimising a design of an electric drive unit with respect to one or more performance parameters, the electric drive unit comprising at least an electric motor, the design comprising parameters defining physical properties of the electric motor and parameters defining drive currents for driving the electric motor, the method comprising:

jointly optimising the parameters defining physical properties of the electric motor and the parameters defining the drive currents over a plurality of iterations, wherein each iteration comprises:

performing the method of claim 1 to predict the one or more performance parameters of the electric drive unit; and adjusting the parameters defining physical properties of the electric motor and the parameters defining the drive currents with an objective of improving the one or more performance parameters.

13. The method according to claim 12, wherein the parameters are adjusted based on a genetic optimisation algorithm.

14. The method according to claim 12, wherein the parameters are adjusted based on a Bayesian optimisation algorithm.

15. The method according to claim 12 further comprising outputting the optimised design for manufacture of a corresponding the electric drive unit.

16. A method of manufacturing an electric drive unit comprising:

implementing the method according to claim 12 to obtain optimised parameters defining physical properties of the electric motor and the parameters defining the drive currents; and manufacturing the electric drive unit according to the obtained parameters.

17. A non-transitory computer readable medium comprising executable instructions that, when executed by a processor, cause the processor to implement the method according to claim 1.

* * * * *